US010611952B2

(12) United States Patent
Savitski et al.

(10) Patent No.: US 10,611,952 B2
(45) Date of Patent: Apr. 7, 2020

(54) FRACTURING A FORMATION WITH MORTAR SLURRY

(71) Applicant: SHELL OIL COMPANY, Houston, TX (US)

(72) Inventors: Alexei Alexandrovich Savitski, Houston, TX (US); Phillip Scott Fair, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/474,186

(22) PCT Filed: Dec. 19, 2017

(86) PCT No.: PCT/US2017/067225
§ 371 (c)(1),
(2) Date: Jun. 27, 2019

(87) PCT Pub. No.: WO2018/125659
PCT Pub. Date: Jul. 5, 2018

(65) Prior Publication Data
US 2019/0322922 A1    Oct. 24, 2019

Related U.S. Application Data

(60) Provisional application No. 62/439,961, filed on Dec. 29, 2016.

(51) Int. Cl.
*E21B 43/26* (2006.01)
*E21B 33/13* (2006.01)
(Continued)

(52) U.S. Cl.
CPC .............. *C09K 8/665* (2013.01); *C04B 28/02* (2013.01); *C09K 8/40* (2013.01); *C09K 8/46* (2013.01);
(Continued)

(58) Field of Classification Search
CPC ........ E21B 43/26; E21B 33/12; E21B 43/267; E21B 33/134; E21B 33/13; E21B 33/14; E21B 33/138; E21B 43/25
See application file for complete search history.

(56) References Cited

U.S. PATENT DOCUMENTS 5,074,359 A    12/1991 Schmidt
5,263,683 A    11/1993 Wong
(Continued)

FOREIGN PATENT DOCUMENTS

SU             1507962 A1     9/1989
WO    WO-2013192399 A2 *    12/2013
WO        2016144767 A1     9/2016

OTHER PUBLICATIONS

International Search Report and Written Opinion received for PCT Patent Application No. PCT/US2017/067225 dated Apr. 5, 2018, 5 pages.

(Continued)

*Primary Examiner* — Zakiya W Bates

(57) ABSTRACT

A method to provide fractures in a formation includes providing a wellbore in the formation and providing a casing in the wellbore. The method also includes providing communication between an inside of the casing and the formation and initiating a fracture from the communication between the inside of the casing and the subterranean formation. The method further includes propagating the fracture with a fluid comprising mortar slurry. Prior to propagating the fracture with a fluid comprising mortar slurry, a fluid comprising acid is injected into the formation through the communication between the inside of the casing and the formation.

7 Claims, 2 Drawing Sheets

(51) Int. Cl.
*C09K 8/66* (2006.01)
*C04B 28/02* (2006.01)
*C09K 8/40* (2006.01)
*C09K 8/46* (2006.01)
*C09K 8/72* (2006.01)
*E21B 33/138* (2006.01)

(52) U.S. Cl.
CPC .............. *C09K 8/72* (2013.01); *E21B 33/138* (2013.01); *E21B 43/261* (2013.01)

(56) References Cited

U.S. PATENT DOCUMENTS

| | | |
|---|---|---|
| 5,487,831 A | 1/1996 | Pirkle et al. |
| 7,044,224 B2 | 5/2006 | Nguyen |
| 7,451,820 B2 | 11/2008 | Albers et al. |
| 8,105,985 B2 | 1/2012 | Wood et al. |
| 8,183,179 B2 | 5/2012 | Garcia-Lopez De Victoria et al. |
| 2013/0341024 A1 | 12/2013 | Fonseca et al. |
| 2014/0367100 A1 | 12/2014 | Oliveira et al. |
| 2015/0075784 A1 | 3/2015 | Fonseca Ocampos et al. |
| 2015/0114664 A1 | 4/2015 | Hulsewe et al. |
| 2017/0210968 A1* | 7/2017 | Mirzaei .................... C09K 8/40 |

OTHER PUBLICATIONS

API Specification for Materials and Testing for Well Cements, API Specification 10A, 24th Ed., Dec. 2010, 52 pages.

* cited by examiner

FRACTURING A FORMATION WITH MORTAR SLURRY

CROSS REFERENCE TO RELATED APPLICATIONS

This is a US national stage application of International Application No. PCT/US2017/067225, filed Dec. 19, 2017, which claims benefit of priority of U.S. application No. 62/439,961, filed Dec. 29, 2016.

BACKGROUND

Hydraulic fracturing is used to increase the area of a formation that is in communication with a wellbore and therefore increasing either production of fluids, or increasing the amount of fluids that may be injected into the formation from the wellbore. Hydraulic fracturing has been in commercial use for many decades, but gradual improvements in the size of fractures that can be created and the cost effectiveness of the fractures, along with developments like improved horizontal drilling and directional drilling, have resulted in hydraulic fracturing enabling production of hydrocarbons from formations such as source rocks or other very low permeability formations, that were previously not considered to be economically producible.

Typically, gas and/or oil is produced from low permeability formations such as source rocks, by providing horizontal wells in the formations for distances of a mile or more. The formation is then fractured from the wellbores in as many as twenty to fifty places, with the fractures placed every 15 to 150 meters along the horizontal wellbore. The fractures are provided by pumping fracturing fluids into an isolated section of the wellbore that is in communication with formation at pressures that exceed the pressure that causes the formation to break, and open up. This allows fracturing fluids to enter the formation through into the fracture and further propagate the fracture until the rate at which fluids go into the formation, via the rock faces of the fracture, equals the rate at which fluids can be pumped into the fracture.

Fractures are either propped open after they are formed by including in the fracturing fluids materials such as finely sized sands or ceramic particles, or in carbonate formations, permeability through fractures may be created by including acids in the fracturing which dissolve some minerals at the face of the fracture to create wormholes along the rock surfaces of the fractures. Proppants may be held in suspension within the fracturing fluids by including additives to increase the viscosity of the fracturing fluids, to decrease the settling rate of the proppants. Alternatively, or in addition, proppants may be utilized with lower densities to decrease the rate at which they settle in the fracture fluids, Polymers used to increase the viscosity of fracturing fluids may be detrimental to formation permeability in the vicinity of the fractures, so techniques referred to as slick water fracturing have been developed. These techniques do not utilize thickening polymers, but instead rely on rapid injection of fracturing fluids.

Fracturing methods are disclosed in, for example, U.S. Pat. Nos. 8,183,179, and 7,451,820, the disclosures of which are incorporated herein by reference.

A method for providing permeability in fractures is described in U.S. Pat. No. 7,044,224. The method involves injecting a permeable cement composition, including a degradable material, into a subterranean formation. The degradation of the degradable material forms voids in a resulting proppant matrix. A problem of the method is that the degradation of the degradable material is difficult to manage. If the degradable material is not mixed uniformly into the cement composition, permeability may be limited. Furthermore, when degradation occurs too quickly, the cement composition fills the voids prior to forming a matrix resulting in decreased permeability. When degradation occurs too slowly, the voids lack connectivity to one another, also resulting in decreased permeability. In order for degradation to occur at the proper time, various conditions (such as pH, temperature, pressure, etc.) must be managed carefully, adding complexity and thus time and cost to the process. Another problem of the method is that the degradable material can be expensive and difficult to transport. Yet another problem of the method is that, even when large amounts of degradable material are used, permeability is only marginally enhanced. Furthermore, the addition of degradable material can have negative impact on flowability Fracturing formations with mortar compositions is known, for example, from US patent application publication US 2013/0341024.

BRIEF SUMMARY

A method to provide fractures in a formation includes providing a wellbore in the formation and providing a casing in the wellbore. The method also includes providing communication between an inside of the casing and the formation and initiating a fracture from the communication between the inside of the casing and the subterranean formation. The method further includes propagating the fracture with a fluid comprising mortar slurry. Prior to propagating the fracture with a fluid comprising mortar slurry, a fluid comprising acid is injected into the formation through the communication between the inside of the casing and the formation.

DETAILED DESCRIPTION

Figure 1:
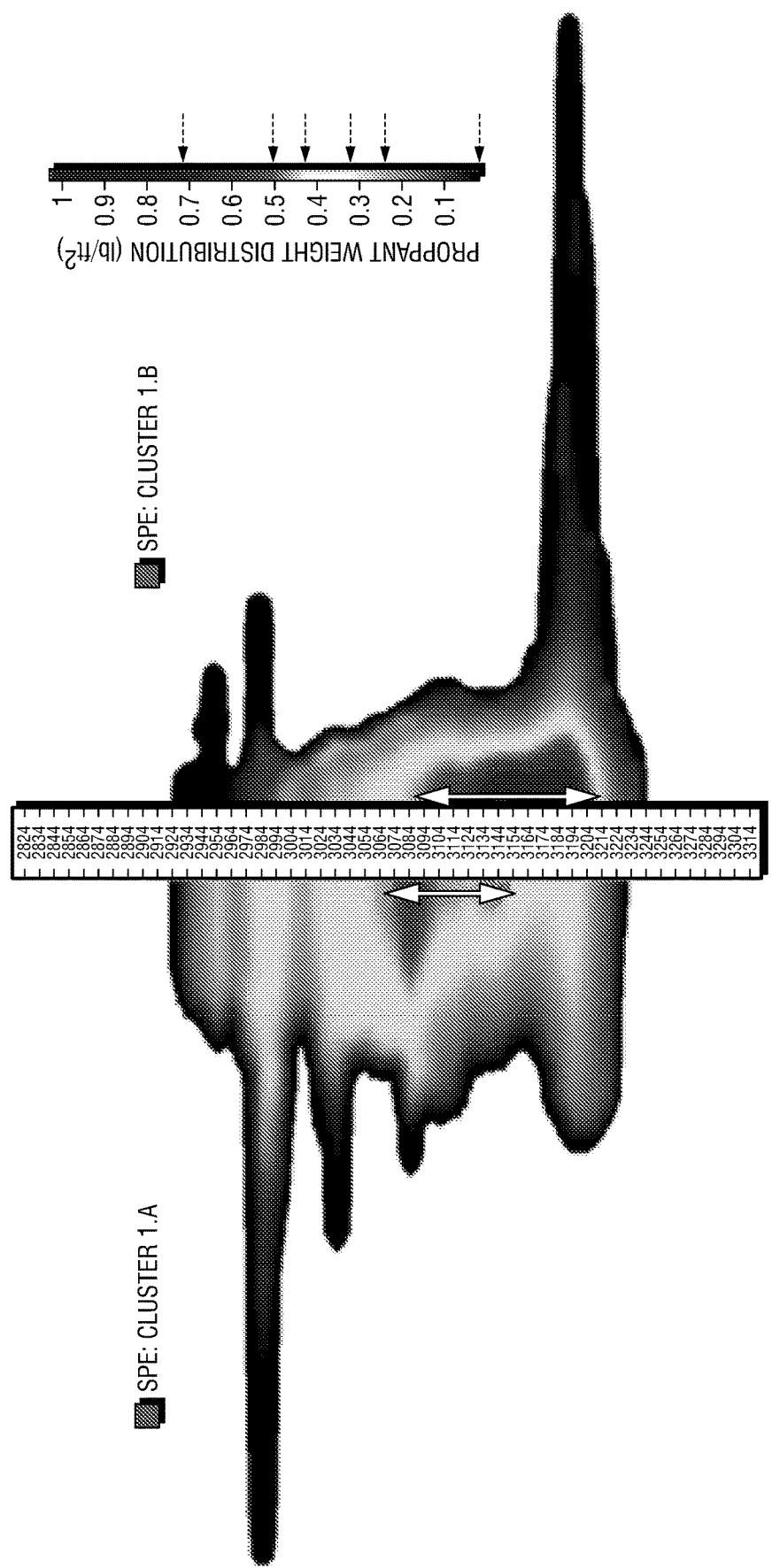
FIG. 1 is a schematic diagram of the different cement densities for a number of different clusters, in accordance with some embodiments.

Generally, a cement slurry or mortar slurry (herein after referred to interchangeably as either cement, mortar, cement slurry or mortar slurry) may set to form a strong, conductive, stone-like mortar after fracturing a source rock. The mortar slurry may simultaneously create and fill fractures, allowing hydrocarbons therein to escape. As the mortar slurry hydrates, cures, or hardens, into a solid, the fractures may remain open, allowing the hydrocarbons to flow into a drilling pipe, so long as the mortar is permeable or has etched surfaces interfacing the formation. Such mortar slurry may reduce or eliminate the need for proppants, which can be expensive and are sometimes unable to maintain initial conductivity. Further, enhanced conductivity through use of a mortar slurry as a fracturing agent, without large amounts of dissolvable materials, gelling agents, foaming agents, and the like may provide a safer, cheaper, more efficient treatment option as compared with conventional methods.

Treatments using the methods described herein may include stimulation, formation stabilization, and/or consolidation. Stimulation using the methods described below may involve use of a mortar slurry in place of traditional fluids such as slick water, linear gel or cross-link gel formulations carrying solid proppant material. The mortar slurry may create the fractures in a target formation zone before hardening into a permeable mortar and becoming conductive, allowing reservoir fluids to flow into the wellbore. Thus, the mortar slurry may serve as the fracturing fluid and proppant material. The mortar slurry may become conductive after hydration such that the fracture geometry created may be conductive without need for a separate proppant. Furthermore, fracture coverage may be increased, resulting in an improved fracture length as a result of more contact area, and corresponding increase in well spacing. In some instances, the well spacing may be doubled, reducing wells by, for example 50% or more. Further, stimulation costs may be significantly reduced. Additionally, the use of water may be reduced, as the mortar slurry may require up to 70%-75% less water than a traditional slick water fracturing operation, thereby significantly reducing flow-back of water upon commencement of production.

The mortar slurry may reach and sustain high design fracture conductivity through (1) management of cracking in a mortar formed by the mortar slurry as the mortar is stressed by the closing formation; (2) management of the conductivity of the mortar slurry as it sets to form a pervious mortar; (3) acid treatment of the mortar formation interface, or (4) a combination thereof. By managing cracking in the mortar, a conductive media may be generated via cracks due to the minimum in situ stress acting on the mortar. Such cracks may form a free path for fluid flow, thus making the cracked mortar a conductive media even if the mortar was less conductive or even relatively nonconductive prior to cracking. The conductivity of the mortar slurry may be managed during setting to form a pervious mortar by providing the mortar slurry with a sand/cementitious material ratio higher than one. Conductivity may be created by agglomeration of sand grains cemented during hydration by choosing a recipe that creates pores in the mortar. The agglomeration may occur as a result of the sand grains being precoated, or as a result of the mix of mortar slurry. Finally, in a mortar having a particular conductivity, managing cracking of a pervious mortar may allow for further enhanced conductivity. Thus, conductivity may be provided via a pervious mortar that is not cracked or acid treated, via an essentially non-pervious mortar that is cracked, or via a pervious mortar that is cracked or acid treated.

In one instance, a method of treating a subterranean formation involves the use of a mortar slurry designed to form a solid mortar designed to crack under a fracture closure pressure. In other words, the mortar slurry may have components in various ratios such that, upon setting, the resulting mortar will have a compressive strength that is less than the closure pressure of the fracture after external pressure has been removed. Thus, when external pressure is removed after the mortar slurry has set and formed the mortar, the fracture closure pressure will compress the mortar. Because the compressive strength of the mortar is less than the fracture closure pressure, such compression will result in a particular degree of cracking of the mortar, causing the permeability of the mortar to be enhanced.

Permeability in cured mortar resulting from voids within the matrix of the mortar is referred to as primary permeability. When the cured mortar is cracked, for example, but application of formation stress that exceeds the compressive strength of the mortar creates secondary permeability. Creation of secondary permeability will increase the total permeability of the cured mortar. Secondary permeability may also be created by including in the mortar slurry components that, after curing of the mortar, either shrink or expand. Components that shrink create additional voids, and also weaken the matrix, resulting in additional cracking when formation stresses are applied. Components that expand after curing of the mortar will result in the cured mortar changing dimensions within the fracture and cause cracks, resulting in secondary permeability.

The methods of treatment described herein may be useful for fracturing, re-fracturing, or any other treatment in which conductivity of a fracture or wellbore is desired. The mortar slurry (liquid phase and solid phase or both or partials of both) may be prepared (e.g., "on the fly" or by a pre-blending process) and placed into the subterranean formation at a pressure sufficient to create a fracture in the subterranean formation. The equipment and process for mixing the components of the mortar slurry (e.g., aggregate, cementitious material, and water) may be batch, semi-batch, or continuous and may include cement pumps, frac pumps, free fall mixers, jet mixers used in drilling rigs, pre-mixing of dried materials (batch mixing), or other equipment or methods. In some instances, the placement of the mortar slurry in the subterranean formation is accomplished by injecting the mortar slurry with pumps at pressures up to 30,000 psi. This downhole pressure of up to 30,000 psi may be attained by surface equipment providing up to 20,000 psi and the hydrostatic head providing the remainder. Injection can be done continuously or in separate batches. Rates of up to about 12 $m^3$/min may be desirable with through tube diameter of up to about 125 mm and through perforations up to about 20 mm Once at least one fracture has been created in the subterranean formation, the pressure will desirably be maintained at a pressure higher than the fracture closure pressure, allowing the mortar slurry to set and form a stone-like mortar. Fracture closure pressure can be obtained from specialized test such micro fracs, mini fracs, leak-off test or from sonic and density log data.

So long as pressure does not drop below the fracture closure pressure between the time the fracture is created and the time the mortar slurry has set, the mortar slurry will fill and form the mortar in the fracture. Once the mortar slurry has set to form the mortar, the pressure can be reduced below the fracture closure pressure, and the mortar in the fracture may be allowed to crack, forming a cracked mortar. In order to ensure cracking of the mortar, the mortar slurry may be designed to set to form a mortar with a compressive strength at or below the fracture closure pressure of the subterranean formation. Additional design compressive strengths of the mortar may be appropriate, depending on the types and amounts of various materials used in the mortar slurry. The compressive strength may be greater than Fracture Closure– 0.5*Reservoir Pressure. This is normally called effective proppant stress or effective confinement stress. In one instance, cracks will be induced by the effect of closure pressure but will not lose integrity as the strength of the mortar is desirably higher than the effective confinement stress. In other words, the compressive strength of the mortar may be any value between the closure pressure and the effective confinement stress, such that the mortar will crack, but not fail, when exposed to closure pressure. For example, if the fracture closure pressure of a particular formation is 8,000 psi and the reservoir pressure is 6,500 psi, the effective confined stress is 8,000–0.5*6,500=4,750 psi, one desirable permeable mortar might have a compressive strength below 8,000 psi, and higher than 4,750 psi. Formations may exert much higher point or line loadings than anticipated on the basis of compressive strength estimates, and those loadings may induce the desired cracking as well. One having ordinary skill in the art will appreciate that the exact compressive strength of the mortar can be selected based on a number of factors, including extent of cracking or permeability desired, cost of materials, flowability, well choke policy, and the like.

In some instances, the mortar slurry may be designed to provide a pervious mortar with a compressive strength above the expected fracture closure pressure. In such instances, selection of materials may ensure sufficient conductivity of the pervious mortar without reliance on cracking of the mortar to provide conductivity.

Whether the mortar slurry is designed such that the mortar cracks or not, the mortar slurry may be designed to ensure that the mortar maintains at least some integrity in the fracture. Thus, various designs of the mortar slurry result in a mortar that has a maximum compressive strength, a minimum compressive strength, or both. A particular mortar slurry provides a mortar that cracks because the maximum compressive strength is sufficiently low, yet maintains structural integrity because the minimum compressive strength is sufficiently high. Stated another way, the mortar may crack while remaining in place and serving as a proppant. The degree to which the mortar may crack may be chosen based on maximizing conductivity, such that there are enough cracks to ensure flow therethrough, but not so many cracks that the mortar breaks into small pieces and blocks or otherwise becomes a hindrance to wellbore operations.

In order to maintain the desired integrity in the fracture, the mortar may have a compressive strength above an effective confinement stress of the formation or above fracture closure if cracking of the mortar is not desired (e.g., if the mortar is a pervious mortar having sufficient permeability without cracking). Additionally, the mortar may have strength sufficient to hold on pressure cycles due to temporary well shutoffs due to maintenance or other operational reasons. In some instances, the mortar may have a compressive strength of about 20 MPa when the postulated fracture closure pressure is about 40 MPa, such that the fracture closure pressure will cause the mortar to crack without being destroyed.

After a permeable mortar has formed in the wellbore as a result of acid treatment, the use of a pervious mortar, as a result of cracking of the mortar, or as a result of any combination thereof, hydrocarbons may be produced from the formation, with the permeable mortar acting to maintain the integrity of the fracture within the formation while allowing the hydrocarbons and other formation fluids to flow into the wellbore. Produced hydrocarbons may flow through the permeable mortar and/or induced cracks while formation sands may be substantially prevented from passing through the permeable mortar.

The mortar slurry includes cementitious material and water. The water may be present in an amount sufficient to form the mortar slurry with a consistency that can be pumped. More particularly, a weight ratio between the water and the cementitious material may be between 0.2 and 0.8, depending on a variety of desired characteristics of the mortar slurry. For example, more water may be used when less viscosity is desired and more cementitious material or less water may be used when strength is desired. Additionally, the ratio of water to cementitious material may be varied depending on whether other materials are used in the mortar slurry. The particular materials used in the mortar slurry may be selected based on flowability, and homogeneity.

A variety of cementitious materials may be suitable, including hydraulic cements formed of calcium, aluminum, silicon, oxygen, iron, and/or aluminum, which set and harden by reaction with water. Hydraulic cements include, but are not limited to, Portland cements, pozzolanic cements, gypsum cements, high alumina content cements, silica cements, high alkalinity cements, micro-cement, slag cement, and fly ash cement. Some cements are classified as Class A, B, C, G, and H cements according to American Petroleum Institute, API Specification for Materials and Testing for Well Cements, API Specification 10A, 24th Ed., December 2010. Other cement types and compositions that may be suitable are set forth in the European standard EN 197-1, which consists of 5 main types. Of those, Type II is divided into seven subtypes based on the type of secondary material. The American standard ASTM C150 covers different types of Portland cement and ASTM C595 covers blended hydraulic cements. The cementitious material may form about 20% to about 90% of the weight of the mortar slurry.

The water in the mortar slurry may be fresh water, salt water (e.g., water containing one or more salts dissolved therein), brine (e.g., saturated salt water), brackish water, flow-back water, produced water, recycle or waste water, lake water, river, pound, mineral, well, swamp, or seawater. Generally, the water may be from any source provided it does not contain an excess of compounds that adversely affect other components in the mortar slurry. The water may be treated to ensure appropriate composition for use in the mortar slurry.

In some instances, the mortar slurry may be designed to provide a pervious mortar with a minimum level of conductivity. For example, the mortar slurry may be designed to set to form a pervious mortar with conductivity from about 10 mD-ft to about 9,000 mD-ft, from about 250 mD-ft to about 1,000 mD-ft, above 100 mD-ft, or above 1,500 mD-ft using gap-graded aggregates, cracking, or both.

The mortar slurry may provide the mortar with the minimum level of conductivity without resorting to certain materials that may be expensive, harmful to the environment, difficult to transport, or otherwise undesirable. In other words, the mortar slurry may essentially exclude certain materials. For example, in some cases, gelling agents, breakers, foaming agents, surfactants, additional viscofiers, and/or degradable materials may be entirely omitted from the mortar slurry, or included in only minimal amounts. Thus, the mortar slurry may include less than 5% gelling agents, less than 5% foaming agents, less than 5% surfactants, and/or less than 5% degradable material based on the weight of the cementitious material in the mortar slurry. For example, the mortar slurry may include less than 4%, less than 3%, less than 2%, less than 1%, less than 0.5%, less than 0.1%, or trace amounts of any of these materials based on the weight of the cementitious material in the mortar slurry.

The mortar slurry may further include aggregate. Some examples of aggregates include standard sand, river sand, crushed rock (such as basalt, lava/volcanic rock, etc.) mineral fillers, and/or secondary or recycled materials such as limestone grains from demineralization of water and fly ash. Other examples include poly-disperse, new, recycle or waste stream solid particles, ceramics, crushed concrete, spent catalyst (e.g., heavy metal leach), and glass particles. Lightweight additives such as bentonite, pozzolan, or diatomaceous earth may also be provided. The aggregate may have a grain size of 0 to 2 mm, 0 to 1 mm, possibly 0.1 to 0.8 mm. The sand/cementitious material ratio may influence mechanical properties of the mortar, such as compressive and flexural strength, as well as the workability, porosity, and permeability of the mortar slurry. The ratio between the sand and the cementitious material may be between 1 and 8, between 1 and 6, or between 2 and 4. In some instances, gap-graded aggregates may be used. Thus, particular ratios of various grain sizes may be selected based on the unique characteristics of each, such that voids are intentionally created in the mortar slurry as it is pumped into the wellbore and sets to form the mortar. Thus, gap-graded aggregates may provide for a void content of the mortar of about 20%, either prior to or after the mortar has cracked to form a permeable mortar. Mixing angularities of particles may allow for better packing mixtures. For example, natural material such as sand with low or high angularity may be used either alone or in conjunction with other materials having similar or dissimilar angularities. When the designed void content is sufficiently high, the mortar may be designed to have a compressive strength higher than the fracture closure pressure. Thus, with gap-graded aggregates, a higher degree of integrity of the mortar may be obtained while allowing for sufficient conductivity. However, if additional conductivity is desired, the gap-graded aggregate may be used in conjunction with the mortar designed to crack under fracture closure pressure, creating an even higher conductivity. Sand grains in some instances may be coated with a cement-based mixture by means of pre-hydration to eliminate sagging and keep the mortar slurry as a single phase liquid; additionally, one may further add a thickening agent or other common solid suspension additive as well as different improvement admixtures to the mortar slurry.

The mortar slurry may include binders such as, but not limited to, Portland cement of which CEM I 52.5 R is a very rapidly hardening example, or others such as Microcem, a special cement with a very small grain size distribution (<10 μm). The latter has very small cement particles and therefore a very high specific surface (i.e., Blaine value), as such it is possible to get very high strengths at an early time. Other cementitious materials such as clinker, fly ash, slag, silica fume, limestone, burnt shale, possolan, and mineral binders may be used for binding.

The mortar slurry may include admixtures of plasticizers or superplasticizers and retarders. Superplasticizers may include, but are not limited to, poly-carboxylate ethers of which a commercial example is BASF Glenium ACE 352 (active component=20% m/m) and/or sulfonated naphthalene formaldehyde condensates of which a commercial example is Cugla PIB HR (active component=35% m/m). Retarders may include, but are not limited to, standard retarders for cement applications known in the art of which commercial examples include CUGLA PIB MMV (active component=25% m/m) and/or BASF Pozzolith 130R (active component=20% m/m).

Optionally, a dispersant may be included in the mortar slurry in an amount effective to aid in dispersing the cementitious and other materials within the mortar slurry. For example, dispersant may be about 0.1% to about 5% by weight of the mortar slurry.

A fluid loss control additive may be included in the mortar slurry to prevent fluid loss from the mortar slurry during placement. Examples of liquid or dissolvable fluid loss control additives include modified synthetic polymers and copolymers, natural gum and their derivatives and derivatized cellulose and starches. If used, the fluid loss control additive generally may be included in an amount sufficient to inhibit fluid loss from the mortar slurry. For example, the fluid loss additive may form about 0% to about 25% by weight of the mortar slurry.

Other additives such as accelerators (e.g., calcium chloride, sodium chloride, triethanolaminic calcium chloride, potassium chloride, calcium nitrite, calcium nitrate, calcium formate, sodium formate, sodium nitrate, triethanolamine, X-seed (BASF), nano-$CaCO_3$, and other alkali and alkaline earth metal halides, formates, nitrates, carbonates, admixtures for cement specified in ASTM C494, or others), retardants (e.g., sodium tartrate, sodium citrate, sodium gluconate, sodium itaconate, tartaric acid, citric acid, gluconic acid, lignosulfonates, and synthetic polymers and copolymers, thixotropic additives, solubale zinc or lead salts, soluble borates, soluble phosphates, calcium lignosulphonate, carbohydrate derivates, sugar based admixtures (such as lignine), admixtures for cement specified in ASTM C494, or others), suspending agents, surfactants, hydrophobic or hydroliphic coatings, PH buffers, or the like may also be in the mortar slurry. Additional additives may include fibers for strengthening or weakening, either polymeric or natural such as cellulose fibers. Cracking additives may also be included. Some cracking additives may include expansive materials (e.g., gypsum, calcium sulfo-aluminate, free lime (CaO), aluminum particles (e.g., metallic aluminum), reactive silica (e.g., course; on long term), etc.), shrinking materials, cement contaminants (e.g., oil, diesel), weak spots (e.g., weak aggregates, volcanic aggregates, etc.), non bonding aggregates (e.g., plastics, resin coated proppant, biodegradable material).

In some instances, conventional proppant material may be added to the mortar slurry. The proppant material may aid in maintaining the fractures propped open. If used, the proppant material may be of a sufficient size to aid in propping the fractures open without negatively affecting the conductivity of the mortar. The general size range may be about 10 to about 80 U.S. mesh. The proppant may have a size in the range from about 12 to about 60 U.S. mesh. Typically, this amount may be substantially less than the amount of proppant material included in a conventional fracturing fluid process.

The mortar slurry may further have glass or other fibers, which may bind or otherwise hold the mortar together as it cracks, limestone, or other filler material to improve cohesion (reduce segregation) of the mortar slurry, or any of a number of additives or materials used in downhole operations involving cementitious material.

The mortar slurry may set to form a pervious mortar in a fracture in a subterranean formation to, among other things, maintain the integrity of the fracture, and prevent the production of particulates with well fluids. The mortar slurry may be prepared on the surface (either on the fly or by a pre-blending process), and then injected into the subterranean formation and/or into fractures or fissures therein by way of a wellbore under a pressure sufficient to perform the desired function. When the fracturing or other mortar slurry placement process is completed, the mortar slurry is allowed to set in the formation fracture(s). A sufficient amount of pressure may be required to maintain the mortar slurry during the setting period to, among other things, prevent the mortar slurry from flowing out of the formation fractures. When set, the pervious mortar may be sufficiently conductive to allow oil, gas, and/or other formation fluids to flow therethrough without allowing the migration of substantial quantities of undesirable particulates to the wellbore. More-over, the pervious mortar may have sufficient compressive strength to maintain the integrity of the fracture(s) in the formation.

The mortar may have sufficient strength to substantially act as a propping agent, e.g., to partially or wholly maintain the integrity of the fracture(s) in the formation to enhance the conductivity of the formation. Importantly, while acting as a propping agent, the mortar may also provide flow channels within the formation, which facilitate the flow of desirable formation fluids to the wellbore. The cracked mortar, while lacking sufficient strength to avoid cracking under fracture closing pressure, may also have sufficient strength to act as a propping agent. In some instances, the permeable mortar (i.e., pervious mortar, cracked mortar, or cracked pervious mortar) may have a permeability ranging from about 0.1 darcies to about 430 darcies; in other instances, the permeable mortar may have a permeability ranging from about 0.1 darcies to about 50 darcies; in still other instances, the permeable mortar may have a permeability of above about 10 darcies, or above about 1 darcy.

When cracking of the mortar is not specifically desired, the methods described above may optionally omit the steps of maintaining a pressure higher than the fracture closure pressure while allowing the mortar slurry to set, and allowing the mortar in the fracture to crack and form a cracked mortar. If such steps are not omitted or are only partially omitted, the mortar may still crack and form the cracked mortar, resulting in enhanced conductivity. However, if cracking is desired, such steps may ensure managed cracking occurs.

Slugs of mortar slurry and proppant laden gel may increase connectivity between cracked mortar locations within the fractures using the proppant and gel sections as connectors. The sections of cracked mortar may provide support for vertical placement of high conductivity material in the fracture. The treatment may be completed at the end with proppant and fluid for better near wellbore conductivity. Low and high frequency and ratio of cracked mortar and gel may depend on equipment capability to cycle between two systems.

In order to provide for efficient pumping and other working of the mortar slurry, the mortar slurry may be designed to flow in accordance with particular limitations of the worksite. Thus, taking into account variables such as temperature, depth of the wellbore and other formation characteristics, the flowability radius may be adjusted. The mortar slurry viscosity, measured by viscometers standard equipment known to the skilled person such a Fann-35 (by Fann Instrument Company of Houston Tex.), may be less than 5,000 cP, or less than 3,000 cP, potentially below 1,000 cP. Likewise, the mortar slurry may be designed to set in accordance with particular limitations of the worksite. Thus, taking into account variables such as temperature, depth of the wellbore, other formation characteristics, the setting time may be adjusted. In some instances, the setting time of the mortar slurry may be at least 60 minutes after pump shut in. In other instances, the setting time of the mortar slurry may be between 2 hours and 6 hours after pump shut in, about 3 hours after pump shut in, or another setting time allowing for placement of the mortar slurry without undesirable delay after placement and before setting. When a setting time has been selected, the method of treating the subterranean formation may include allowing the mortar slurry to set by waiting the designed set time. For example, when the setting time of the mortar slurry is 60 minutes, the method may include waiting at least 60 minutes after injecting stops. A person skilled in the art will appreciate that certain retarder technologies may affect the mortar slurry strength development which may be taken into account and compensated for.

Upon setting of the mortar slurry, the mortar (e.g., a pervious mortar) may have a conductivity above 100 mD-ft, and the mortar slurry may be designed to provide such conductivity in the mortar. Prior to cracking, a pervious mortar may have a first conductivity. Such conductivity may result from a continuous open pore structure and/or cracks formed in the pervious mortar. After cracking of the pervious mortar, the cracked pervious mortar may have a higher conductivity because of the void space created by the cracks. For example, cracking may provide cracks having widths of about 0.5 mm Thus, a second conductivity of the pervious mortar may be greater than the first conductivity of the pervious mortar prior to cracking. For example, the first conductivity may be at least 100 mD-ft, and the second conductivity may be at least 250 mD-ft. The second conductivity may be a degree or percentage greater than the first conductivity. For example, the second conductivity may be at least 25 mD-ft, 50 mD-ft, 100 mD-ft, 250 mD-ft, 500 mD-ft, or 1,000 mD-ft greater than the first conductivity. These values may apply to confinement stress of up to about 15,000 psi, with different values applicable to different applied net pressure.

Upon setting of the mortar slurry, the mortar may have a salinity tolerance above 3% brine, and the mortar slurry may be designed to provide such salinity tolerance in the mortar. For example, the salinity tolerance may be between about 1% brine and about 25% brine. A person skilled the art may appreciate that with high salinity or alkali content, some aggregates may show unwanted alkali-silica reactivity and hence such materials are not preferred here.

The mortar slurry may be designed with a setting temperature of about 50° C. to about 330° C., designed with a setting temperature of below 150° C., or designed with a setting temperature of above 150° C.

In one instance, the mortar slurry may be formed of 27.7 wt % Portland cement, 13.9 wt % in ground water, 55.4 wt % 0-1 mm sand, 1.7 wt % retarder, and 1.3 wt % superplasticizer.

In some instances, cement slurry may have a specific gravity that is 2 or greater, or between 2.1 and 2.5. With this gravity of slurry, a hydrostatic head of the column of slurry in the casing will generally exceed the fracture pressure of the formation with no excess pressure applied to the fluids in the casing at the surface during the fracturing operation. It may be useful to apply pressure to the fluids in the casing before or after fracturing by the slurry, for example, to create an initial fracture or to remove cement from the casing either by forcing the cement into the fracture or circulating the cement up the casing by injection of brines or other fluids into the casing via, for example, a coiled tubing. When pressure is applied to the fluids in the casing from the surface for these operations, the volume of fluids does not need to be significant. Therefore fracturing pumps with large capacities are not needed. Further, if coiled tubing is used to place cement in the wellbore, the high pressure pumps do not need to pump cement slurry. Only relatively small volumes of fluids containing proppants need to be pumped at high pressures, so maintenance of the pumps is greatly reduced.

Wellbores may be provided by known means of drilling and completion of wells. The wellbore may be vertical, but the presently disclosed technology maybe more beneficial when applied to horizontal wells because a significant number of fractures may be provided from horizontal wellbores. Horizontal laterals may be provided by directional drilling techniques that utilize accelerometers to determine positions of the wellbore and steerable motors to drive the drill bit, or by utilizing logging while drilling techniques to maintain the well near a target location within a formation, or within a predetermined distance and direction from a reference wellbore. Techniques are being developed to extend the distance which horizontal wells may be provided, because generally, a longer horizontal section will enable access to a larger volume of a formation more economically because the expense of providing wellheads and wellbores through the overburden are reduced with respect to a volume of formation to be accessed. Techniques such as neutrally buoyant drill pipes or tractors to supplement the weight on the drill bit may be useful to increase a length of horizontal well that may be provided.

After a wellbore is provided, it may be completed, for example, by known means of providing casing and cementing the casing in the wellbore. The casing will generally need to be perforated prior to the operation of fracturing the formation. Perforations maybe provided by placing shaped charges in tools that are positioned in the wellbore and the shaped charges detonated. The shaped charges force open holes in the casing, and through any cement in the annulus between the casing and into the formation. Thus, communication is established between the inside of the casing and the formation.

The casing may be provided in a series of decreasing sizes. This is because the difference between the fracturing pressure of the formation, and the pore pressure of the formation, permits only a certain distance to be drilled before a single drilling fluid density will not be sufficient to keep the pressure within the wellbore above the pore pressure of the formation being drilled, and below the pressure which will fracture the formation, plus a margin of safety. Thus, at that point, the wellbore will need to be provided with a casing, typically cemented into the wellbore, to isolate the wellbore from the formation and permit continued drilling. Thus, wells are typically provided with a series of casings cemented into the wellbore with the largest diameter casing first, and each subsequent casing having a slightly smaller diameter.

Fracturing of formations may be accomplished by injection of a slurry of fracturing fluid into the formation at pressures sufficiently great to exceed the tensile strength of the formation and cause the formation to separate at the point of the perforations. Formations will generally have a direction where the formation is under the least amount of stress, and the fracture will initially propagate in a plane perpendicular to the direction of such least stress. In deep formations, such as is generally the case in formations containing what is known as light tight oil, shale gas, or tight sands formation, the weight of the overburden will generally assure that the direction of minimal stress is a horizontal direction. It is generally the goal to provide horizontal wellbores in such formation in the direction of the minimal formation stress so that fractures from the wellbore will tend to be perpendicular to the wellbore. This allows access to the maximum possible volume of formation from a horizontal wellbore of a limited length.

Methods for hydraulic fracturing of formations are suggested, in for example, U.S. Pat. No. 5,074,359 to Schmidt and U.S. Pat. No. 5,487,831, to Hainey et al., the disclosures of which are incorporated herein by reference.

Fracking processes may be initiated by a slug of fluids referred to as a pad, which initiates the fracture, followed by fluids that contain mortar slurry.

Another additive generally present in fracturing fluids is friction reduction chemicals. U.S. Pat. No. 8,105,985, to Wood et al, for example, discloses acceptable combinations of water soluble fiction reducing polymers useful in fracturing fluids gelled with viscoelastic surfactants. Such friction reduction chemicals may be utilized, but optimal amounts of such chemicals may be reduced as a result of the coatings provided to the wellbore tubular.

Fracturing fluids may also contain other components, such as acids for breaking the thickening polymers, salts such as calcium chlorides to increase the density of the fluids, corrosion inhibitors or other additives known to be useful in fracturing fluids.

A cementing job and the associated cement may be formulated for fracture divergence within a stage through pressure drop at perforations. Most fracturing operations aim to create multiple fractures per stage. This is accomplished in slick water fractures by limiting the entry of fluid into a single cluster by not creating enough perforated area (either through or a combination of hole quantity, size and penetration) to allow the entry of the fluids at the total rate that they are pumped into the well. When the total flow rate cannot be accommodated into the single cluster, fluids are "diverted" to the closest set of perforations that are not yet accepting any stimulation fluids. Another method involves pumping a small amount of a thick fluid with a breaker that, once it reaches the perforations, thickens creating a temporary (based on the duration of the chemical breaker to take effect) restriction that results in divergence. In the case of this technology, cement composition (solids, viscosity and/ or thickness individually or in combination based) can be tuned to reach a threshold.

Solids in the cement may be engineered proppant, proppant sand or other materials in concentrations between 6 to 10, 4 to 8, or 9 to 15 pounds per gallon to reach the perforation restricting the flow creating the divergence. Viscosity in the cement could be increased based on the water to cement ratio to reach levels of 5,000 to 10,000, 7,000 to 15,000 centipoise and create the divergence and cement thickness based on the amount of retarder could be timed that when it reaches the perforations loose pumpability. Some of these composition changes may be possible with stimulation gel systems but a key difference is that the hardening but cracked property of the cement that provides conductivity does not require chemical breakers thus it is simpler to employ divergence because it is about tuning at the desired type the modification in the mixture (water/ cement ratios, aggregate when available or retarder/accelerant) without the addition of additional equipment to supply breakers and/or polymer cross linkers.

A cementing job and the associated cement may be formulated for fracture divergence within a stage through fracture growth screen out. The hardening property of cement stimulation in comparison to other stimulation fluids can be used to create fracture divergence with a lower screen out risk. Divergence is usually created at the perforations by adding a timed additional restriction to flow. The risk of this approach is that this restriction can be created by mistake (it is hard to control flow on a pipe with multiple set of holes) on clusters that have not yet been stimulated resulting in limited injectivity across the entire stage. The hardening property of the cement, if timed correctly, can create fracture divergence in a manner that significantly reduce the screen out risk. Injection into a hydraulic fracture happens because the fracture grows in size to accommodate the fluid volumes injected minus the fluid amount that leaks into the formation. If cement starts to harden while inside the fracture to the point of restricted mobility will result in limited fracture growth and loss of injectivity to this fracture. This limited fracture growth will make the next unstimulated cluster the path of least resistance for cement trying to enter the fracture being stimulated resulting in divergence. Timing cement thickening to stop fracture growth can be done in a way to tail the cement with desired near wellbore conductivity enhancement like acid of water/gel with proppant if needed. Besides the lower screen out risk of this technique because does not plug up the perforations, it also allows to create fracture divergence at a lower cost compared to slickwater because excessive fluid rate capacity is not required to maintain/create divergence potential. This reduces mobilization and footprint costs. Thus, cracked mortar can be designed to be self-diverting at low flow rates and lower screen out risk.

Cementing with high density cement may be useful in enhancing fracture downward growth. In normal fracturing operations, fractures are seen by microsiesmic data to grow in and upward direction from the initial point of fracture. This may be because the hydrostatic head of the normal fracturing fluid in a fracture is generally less than the fracture gradient of the formation, and the pressure to propagate the fracture comes from very high pressure pumps at the surface. Within the fracture, the rock being fractured sees the sum of a hydrostatic head of fluid, plus the pressure applied at the surface, less hydraulic losses due to the flow of fluids. The fracture pressure within the fracture is exceeded more at the top of the fracture then the bottom of the fracture because the hydrostatic head of fluids within the fracture is less than the fracture gradient of the rock being fractured. This can occur when attempting to develop reservoirs located below depleted zones such as the beta shale in the Permian Basin. With a very high density of fracturing fluid, the opposite would be true. With a fracturing fluid that is a cement slurry or mortar slurry having a specific gravity of greater than 2, the fracture pressure within the fracture will be exceeded more at the bottom of the fracture than at the top of the fracture. The fractures will tend to grow downward in the case where the fracture gradient within the formation being fractured is exceeded by the hydrostatic head of fracturing fluids.

In some instances, a wellbore could be provided with fractures using fracturing fluids having specific gravities which do not exceed the fracture gradient of the formation, thus producing upward fractures, and then fractures could be provided using fracturing fluids having specific gravities which exceed the fracture gradient of the formation being fractured, thus providing fractures that tend to grow downward. The fluids with specific gravities that do not exceed the fracture gradient of the formation could be traditional slick water fracturing fluids, polymer gelled fracturing fluids, or simply slugs of sand and water. The fracture fluid having a density less than the fracture gradient of the formation could also be a cement slurry or mortar slurry fracturing fluid if such fluid is of sufficiently low density. Low density cement slurrys or mortar slurries could be provided, for example, but providing hollow sphere proppant type of material, or low density plastic material in the slurries. If such low density material were also degradable, they could also improve permeability of the cured slurries. More of the formation could be accessed by fractures when fracturing fluids of such differing specific gravities are utilized.

The fractures could be provided in an initial completion process, or, for example, a well that had been provided with fractures using fracturing fluids that do not exceed the fracture gradient of the formation, and optionally produced. This conventionally fractured and produced well could then be refractured with a cement slurry or mortar slurry fracturing process to add fractures that extend down rather than up, and thus accessing a completely unproduced portion of the formation from the existing wellbore.

In another instance, a specific gravity of a fracturing fluid is selected based on a position of the wellbore in relationship with the formation to be accessed by the fracture. If the formation to be accessed by the fracture is below the wellbore, a fracturing fluid with a specific gravity that exceeds the formation fracture gradient is selected. If the formation to be accessed by the fracture is above the wellbore, a fracturing fluid with a specific gravity that is less than the formation to be fractured is selected. The position of the formation to be accessed may be below the wellbore because, for example, the wellbore was provided initially near the top of the formation to be accessed, or because upward fractures have been provided, and the formation above the wellbore has already been produced. If the wellbore is near the center of the formation to be accessed, a fracturing fluid having a gravity within, for example, plus or minus ten percent of the fracture gradient, could be used.

In another instance, an essentially horizontal wellbore could be placed in a formation near the top of the formation to be fractured, and cement slurry or mortar slurry used to fracture the formation, resulting in downward fractures, thus accessing the whole formation. The essentially horizontal wellbore could be, for example, in the top quarter of the formation, or for example, in the top ten percent of the formation. By essentially horizontal, it is intended to include any inclination that would correspond to the inclination of the upper and/or lower surfaces of the formation being fractured. Essentially horizontal could also include wells that penetrate a formation from top to bottom, but an an angle of, for example, less than forty-five degrees from vertical.

Cementing with low density cement may enhance fracture upward growth. In certain cases like landing wells above a water contact or horizons with barriers within the pay zone like in the Eagle Ford. Marcellus or the Haynesville shale, it may be desirable to create predominantly upward growth. This may be achieved by lightening the cement with entrained gas (air, Nitrogen, Carbon Dioxide, etc). In this particular case the cement density is calculated as such to be less than the pore pressure of the formation, thereby creating a bias toward upward growth as compared to the example above which enhanced fracture downward growth with high density fluid.

Cementing with alternating high and low density cement may enhance fracture vertical coverage. For very thick pay zones that rely on vertical wells, such as Pinedale in Wyoming, or on different rows of horizontal wells, such as the Motney in Alberta, an alternate combination in the same stage of high density cement followed (with our without a spacer for near wellbore conductivity enhancement like acid or water/gel proppant) by low density cement pumped from the same cluster or 2 clusters very close (3 to 10 ft, 5 to 15 ft, 9 to 30 ft) to each other can create greater vertical coverage. A simulation example for slickweater stimulation is shown to illustrate this mechanics. In the particular case one new fracture (cluster 1.B) near an existing one that has already grown upward (Cluster 1.A) shows how this second fracture because of the shadow stress alone grows then preferentially down resulting in a combined increase (read area of high conductivity) in overall vertical coverage. Using in combinations for cluster 1.A and 1.B different cement denisties can increase further the bias and overall vertical coverage.

See FIG. 1.

For horizontal well developments, this can result in fewer row of wells for thick pays. For vertical well developments, this technique reduces the overall cost of well staging activities (perforations and plugs) because the same set of perforations can be used to pump both the high density and low density cement.

Gravity feed may also be a useful aspect. When a fracturing fluid is utilized that has a gravity that exceeds the fracture gradient of the formation, after a fracture is initiated and the wellbore contains cement slurry or mortar slurry, pressure in addition to atmospheric pressure, is not required at the surface. Such fracture fluids will propogate a fracture so long as the fluids are provided into the wellbore. The hydrostatic head of the fluids in the wellbore will propogate the fracture. This may be particularly useful in remote locations lacking access to adequate high pressure cement pumping equipment and/or suitable fracture propping material such as frontier exploration of tight gas and oil outside North America, Argentina & China.

In another instance, when cement slurry or mortar slurry is used as fracturing fluid, a coiled tubing may be used to place cement in the wellbore. Proving a cement slurry or mortar slurry fracturing fluid to the wellbore near the location of the fractures through a coiled tubing allows for lighter wellbore fluids within the casing to be circulated up the annulus around the casing until the hydrostatic head of fluids in the wellbore exceed the fracture initiation pressure. After the fracture is formed, cement could be circulated out of the casing by displacing the cement with lighter fluids, and thus the fracturing process could be completed without having to apply additional pressure to the casing at the surface. If a coiled tubing is used in this fashion, the coiled tubing could be provided with an actuator to operate valves in the casing string such as sliding sleeve valves to provide communication from inside the casing to the formation, and/or flapper valves to provide isolation from previously provided fractures.

In another instance, after the cement is formed, it can be displaced instead with coiled tubing circulation with the addition of a heavy brine that is either prepared or comes from brackish water close to the site. Hole displacement may be important because such displacement prevents the well from cementing, providing the opportunity to add a near wellbore conductivity enhancement if desired and can be a spacer for fracture divergence in case of multistage stimulated wells.

Use of non-oil and gas stimulation equipment may be beneficial. Because it uses less water and has a higher density, cracked requires overall less equipment and surface pressure to be placed inside the well. This simplification opens the opportunity to use less expensive equipment compared to traditional stimulation equipment which is rated for high wear and tear and pressure. Before placing the cement into the formation, a breakdown of the rock in the desire cluster needs to be achieved. Applied hydraulic pressure for this may be accomplished with pumps designed to pressure up well annulus for casing tests or mud pumps to circulate mud for drilling applications. After breakdown, these pumps come with connectivity to suitable storage of enough capacity to supply a few wellbores volumes of fluid to achieve the formation breakdown. Once the formation has broken, a simple manifold may allow a pump system for cement, hydraulic fracturing or mud system for placement of the cement. The cement at this stage could be mixed at real time "on the fly" in cementing mixing equipment for oil and gas applications or could have been batch mixed and properly delayed while providing movement to avoid setting. This may be done by construction cement trucks that may then pour the cement into the hoppers of the mud pumps. These trucks may have received the cement from a cement batch mixing plant on the well location, nearby or at the cement manufacturing site. After the cement is placed in the formation and applying if needed the most appropriate near wellbore conductivity enhancement technique and diversion, the cement may be displaced in the wellbore. This may be achieved through pressure or with a heavy brine if pumping power is limited. To keep a clean wellbore, the cement residue may be removed or minimized through the use of a sand slug, wiper dart for later milling, drift size dissolvable or millable balls, conventional frac plugs with a wiper dart or element of similar functionality on the bottom or those inventions described in related application PCT/US2016/020923.

Figure 2:
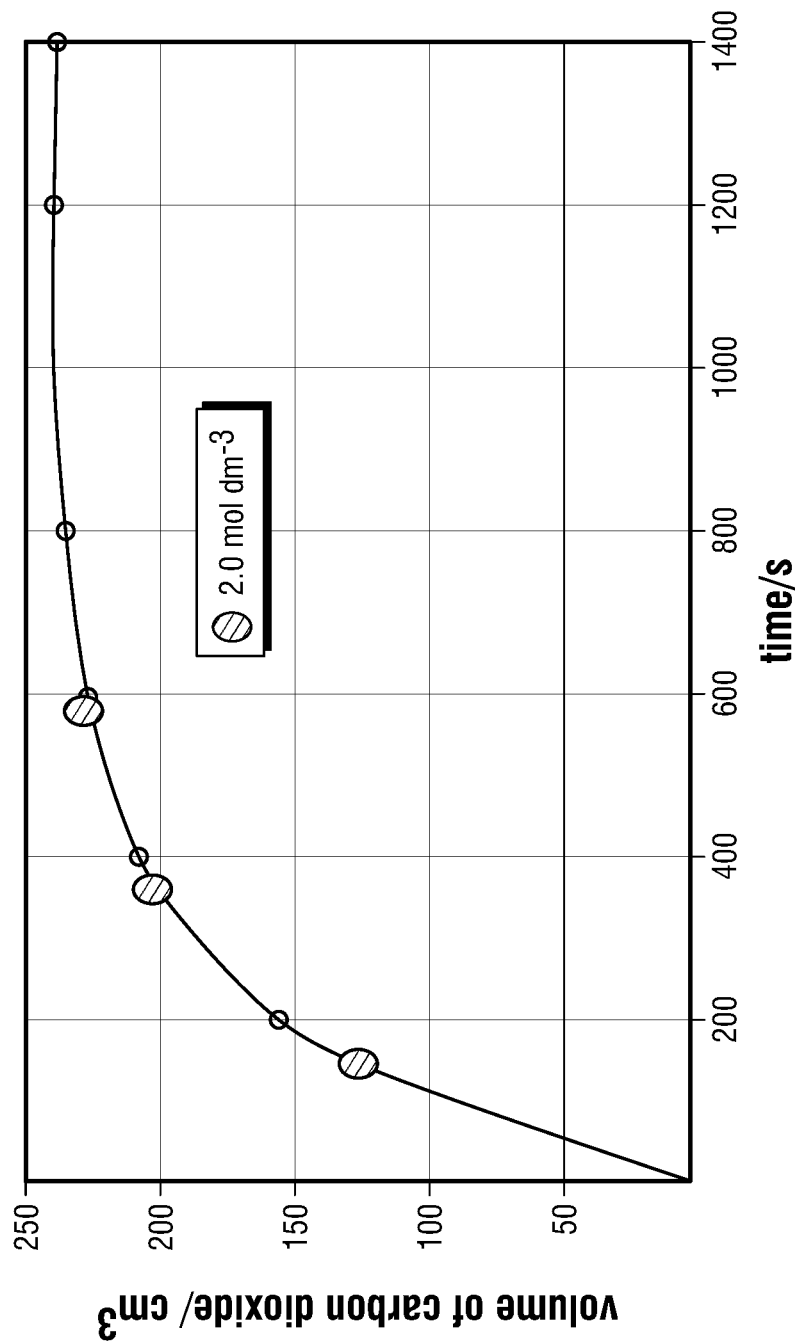
FIG. 2 is a graph indicating residence time as a function of pump rate, in accordance with some embodiments.

Acid treatment of the cement fracture may be useful. The initial fracture could include an acid treatment. Acids treatments are often used at the beginning of a fracturing operation to remove some cement from the annulus around perforations or sliding valve openings. This acid treatment can reduce pressure drop in the near wellbore region significantly which may be useful for increasing the injectivity of the cement during the stimulation treatment and later during production by keeping open the near wellbore to allow reservoir fluids to come into the well with small pressure drops. This may complement very well cracked mortar stimulation in cases the conductivity of the cracked material is not sufficient for near the wellbore. This can happen in formations with higher productivity. This combinations allows a dual conductivity system, one from the acid that is higher and in the near wellbore and another farther from the near wellbore and lower but sufficient from the cracked mortar. In combination, it acts as a continuous path for smooth production from the reservoir to the well. Those with experience in the industry might argue that enough volume of acid should be added to create a 10 to 30 ft. stimulated radial zone away from the wellbore. Reservoir simulations support that this distance represents what is denominated the critical wellbore because the flow velocities grow very fast (convergence of flow) in comparison to flow velocities in the average drainage zones of the reservoirs. Pumping rate is also very important to achieve conductivity in the correct location. In the desired to achieve 10 ft (3 meters) of stimulated area, the reaction rate the acid rate has to accommodate enough residence time in that area to achieve full reaction. The residence time is a function of pump rate. An example for the Permian Basin calculation indicates that rates between 5 to 3 barrels/minute (BPM) are recommended to achieve 10 ft. of penetration. The volume of acid for this particular example is 29 bbl or 15% the wellbore volume, See FIG. 2.

Placing acid into the fracture before fracturing with cement slurry could result in essentially an acid treatment to the surfaces of the cured cement in the fracture. The acid would be forced either deeper into the fracture or into the formation at the face of the fracture. After fracturing pressures are released, the acids, or resulting neutralized salts, would tend to flow back toward the wellbore. The acid would either react with carbonates in the formation, or upon flowing back into the fracture, react with carbonates in the cured cement, thus creating flow paths for formation fluids along the surface of the cement in the fracture.

A useful fluid for acid is 15% w to 28% w hydrochloric acid. Alternatively, formic, sulfuric, phosphoric, nitric, or acetic acid, or combinations thereof, may be used. These acids are easier to inhibit under high-temperature conditions. However, acetic and formic acid generally cost more than hydrocloric.

Typically, a gelled water or crosslinked gel fluid may be used as a pad fluid to fill the wellbore and break down the formation. The water-based pad is then pumped to create an initial fracture. The acid may be if fluids that are gelled, crosslinked, or emulsified to maintain fracture width and minimize fluid leakoff. Fluid-loss additives may be added to the acid fluid to reduce fluid leakoff.

An acid treatment could be followed by a spacer fluid to reduce back-mixing of acid with cement slurry or mortar slurry. The spacer fluid could be a gelled fluid, or a fluid containing thickeners, to match viscosity of the cement slurry or mortar slurry at wellbore temperatures to help reduce back mixing between the spacer and the slurry. Preferably, the viscosity of the spacer fluid is adjusted to be within an order of magnitude of the viscosity of the cement slurry or mortar slurry.

The present technology, when using cement slurry or mortar slurry as a fracturing fluid, could be practiced by continuing to place the slurry into the casing from the surface from creation of the initial fracture until the last fracture is formed. In this instance, when sufficient cement has been forced into a fracture, a slug of gelled proppant containing fluid could be put into the casing, followed by a spacer of fluids without proppant, then an acid slug. When the proppant containing fluid is essentially in the fracture, the wire line controllable valves could be operated to isolate the newly created fracture, and open the next first wire line controllable valve providing communications between the inside of the casing and the formation. The acid would be placed to then enter the formation and create a new fracture. During this operation, if the casing is filled with acid rather than cement slurry, it may be necessary to apply pressure to the fluids in the casing from the surface to fracture the formation and force acid into the formation. In this instance, fluids could be pumped into the casing almost continuously from initiation of the first fracture until the last fracture is completed.

Water use reduction may be another upside to the technology. An advantage of using cement or mortar slurry as fracturing fluid, compared to either slick water or polymer gel proppant methods, is that water use is reduced by at least half. Further, all of the water that is injected in a normal slick water or polymer gelled fracturing operation is eventually produced. This water, when it is produced, may be saturated with hydrocarbons and salts, and may need considerable treatment prior to disposal. Because most of the water that is used for the cement or mortar slurry fracturing process is consumed in hydration of the cement or mortar, very small amounts of fluids are produced which need to be treated or disposed of. In particular, high density slurries contain a higher ratio of solids to water, and this reduces the amount of unreacted water remaining after the cement or mortar cures. Because water rights can be scarce in some locations, this significant reduction in water consumption is a significant advantage. For example, more than more than fifty percent, or in another instance, more than ninety percent of the water injected in the fracturing process could be consumed in hydration of the cement or mortar, or between ninety five and ninety nine percent of the water injected in the fracturing process could be consumed by hydration of the cement or mortar.

Such water for hydration may be in the form of droplets in air, liquid water, a brine, formation water, new, recycle, or waste stream (e.g., sea water, pond, river, lake, creak, glacier, melted ice or snow, flow back water, sewer, brackish water, etc.). Furthermore, moisture may be provided without the use of water. Likewise, the slurry pumped downhole may or may not include water. Other alternatives which might be used in conjunction with water, or as a replacement to water include thick fluids and gels.

Another advantage of using cement slurry or mortar slurry as fracturing fluids is that it is found that after the cement hydrates and production is initiated, because so little water flows back into the wellbore, normal production starts in a very short time period. For example, normal production could be started within one day or within one to three days of initial flow from the wellbore. Typically, after a well is fractured or refractured, production needs to be isolated for five to thirty days because of sand and water contents that exceed the capacity of normal production systems. During this five to thirty day period, temporary equipment and operators costing from 100,000 to 500,000 or more are required for each well, and this temporary equipment and operators are not needed with the present technology.

Another advantage of using cement slurry or mortar slurry for fracturing is that the footprint of required equipment is significantly reduced compared to normal slick water or polymer gelled fracturing fluid methods. Although high head pumps may be needed for initially creating fractures and for forcing cement in the wellbore into the fracture at the conclusion of the fracturing operation, these operations do not require large volumes, so expensive pumps for fracturing fluids are mostly eliminated. In general, power requirements of the present technology can be about a third of power requirements for a slick water fracturing operation.

Another advantage of using cement slurry or mortar slurry for fracturing is that land, carbon dioxide and noise foot prints are significantly reduced compared to normal slick water or polymer gelled fracturing fluid methods. Significant reductions in these footprints result from reduced horsepower used to place the material into fractures. Additionally, the carbons dioxide is generated and less water is used, along with significant reductions in the amount of water that requires treatment results from flow-back of water after a completion operation being almost eliminated by the present technology. Reduced water use and waste water production also reduces trucking requirements.

Another advantage of the present technology when cement slurry or mortar slurry is used as fracturing fluid is that normal surface well head equipment used for fracturing, referred to as the frac tree, is not needed. The fracturing can be done through a normal blow-out preventer. Not having to change surface equipment reduces cost and time and saves a significant amount of expense.

The techniques of this disclosure may be useful in CO2 disposal. Stimulating with a fluid that hardens has the advantage that the remaining solid structure can be used to dispose components. CO2 stimulation is conventionally done in reservoirs of low pressure in order to increase the chances of the reservoir to flowback the stimulation fluids. The presence of CO2 makes the stimulation fluid lighter, thus easier to flow back. For traditional CO2 stimulation, the CO2 finds its way back to the well and the corrosive nature in the presence of water must be mitigated with corrosion inhibitors, upgared in well materials and acid inhibition/neutralization on surface. In the case of cement stimulation and if CO2 is added, a material amount of CO2 can stay entrapped in the cement thus staying in the reservoir and considered to be disposed of. Given the large scale of hydraulic fracturing in North America, cracked mortar stimulation presents the opportunity of becoming a dual purpose process of not only stimulating the reservoir but the solid continuous phases of cement in the fracture to become permanent storage for CO2 disposal.

Protecting aquifers and casings is another possible advantage. In another instance with cement slurry or mortar slurry being used as fracturing fluid, density of the cement is chosen so that the hydrostatic head of a column of cement equal to the elevation from the formation to be fractured to the lowest aquafer exceeds the fracture pressure of the formation to be fractured. By using a cement slurry or mortar slurry of this density, it will not be possible for a fracture to reach the aquifer, and even if cement in the annulus around the casing completely fails, the cement in the annulus will not reach the aquifer.

In another instance with cement slurry or mortar slurry being used as a fracturing fluid is utilized that has a density that results in a hydrostatic head less than the depth of the well. An advantage of this is that no pressure is needed at the surface during the fracturing process. High pressures required by normal fracturing processes occasionally result in equipment or wellbore failures.

The technology described herein may provide for a stimulation technique for zones of high induced seismicity risk. The studies of induced seismicity related to oil and gas activities indicates that the greatest risk of induced seismicity comes from extended water injection that, if done near faults, can lubricate the faults to a point of reduced stability. Cracked mortar stimulation, as a fluid that hardens, will not have the same lubricating effect of water in case that it leaks and penetrates faults. Rather, as hardened cement that is load bearing, it may provide some level of stability. The industry and regulators take a calculated risk approach to stimulation in zones with faults or on locations with no seismic data to identify these features. Cracked mortar stimulation, since it will not provide lubrication but actually some level of load stabilization in case of leakage into a fault, is a potential lower risk solution. This feature of cracked mortar is very useful in large faulted areas that may currently be too risky or those areas with very little knowledge on the location of faults because they may be in exploratory nature and lack seismic data.

The teachings herein may allow for cement volume based microseismic monitoring (MSM) interpretation of a propped area. In traditional slickwater stimulation, the hydraulic fracture area is very large in comparison to the effective and producing fracture area. This is mostly due to the small proppant concentrations that the water can effectively carry. This makes interpretation of effective fracture area very challenging because the analyst receives, from microseismic, a stimulated volume that relates to the total volume of water but then through modeling of sand transport and mass balance tries to constrain what is the final propped volume. In the case of cement stimulation and as shown in the gatherings of MSM, the stimulated area corresponds much better to the volume of cement. This is a much more direct method of reconciliation of the stimulated fracture dimensions. The MSM provides a constrain on fracture height and length and since the total final fracture volume has to equal the cement volume, the pumped volume of cement is used to derive the fracture width. This is a much efficient fracture dimension determination and can result in much accurate well landing depth and lateral spacing decisions.

Settling of solids may be another beneficial use. In another instance when using cement slurry or mortar slurry as fracturing fluid, a slurry is provided from which clear water and solids tend to separate. Although application is not bound by the theory, it is believed that using a slurry from which solids tend to settle results in an interface near the top of the fracture where cement props a fracture open, and a channel above the cement and water interface results in a channel above this interface that extends deep into the fracture and allows for flow back into the wellbore. Having more dense slurries in a bottom portion of a fracture will result in cured mortars at the bottom of the fracture to be stronger, and enable the cured mortar to prop open the fracture after formation insitu stress is allowed to close on the cured mortar, and also result in a more permeable top portion of the fracture due to the free water and lower density cement in the top portion of the fracture. A tendency for cement slurry or mortar slurries to separate may be indicated by results of an API Free Fluid test, or an API Sedimentation test.

The API Free Fluid test is conducted in a 250 ml tail glass graduated cylinder that is placed in an oven at the test temperature. The test is 2 hours long and since it is glass separation and visual discoloration can be seen visually. Whether the slurry is stable can be seen visually. The volume of free fluids at the top of the graduated cylinder may be measured. A slurry for practice of the present technology may have greater than two percent by volume of free fluids, or between two and four percent by volume of free fluids, or between one and six percent by volume of free fluid by the API Free Fluid test.

The API Sedimentation test first requires conditioning the slurry to test temperature and then the slurry is poured into a brass mold. The molds are then placed in a pressurized curing chamber at test temperature and the cement is allowed to cure. That is usually for about 36 to 48 hrs. The mold with the set cement inside is then broke open and the density of the set cement is measured in sections from top to bottom. If the slurry has less density at the top then the bottom we say that the slurry has settling. For the present technology it is desirable that the slurry have significant settling tendencies. Cement with a higher density will have a faster development of compressive strength. It is that higher compressive strength that helps to support open the fracture. For the present technology, a slurry could be used that results in greater than one and a half pounds per gallon density difference between the top and the bottom using the API Sedimentation test.

Typically, for applications such as wellbore annulus cementing, chemical additives such as viscosifiers are used to prevent or reduce free water as determined by the API Free Fluid test, or strength difference according to the API Sedimentation test, but for some instances of the present technology, additives such as dispersants are included in the cement slurry or mortar slurry to increase the tendency for the cement slurry or mortar slurry to separate. Exemplary dispersants include lignosulfonate based dispersants, naphthalene-sulfonic-formaldehyde condensates, acetone-formaldehyde-sulfite condensates, and flucano-delta-lactone. Useful concentrations of dispersants may be between 0.1 and 0.5 percent by weight based on the dry cement content of the slurry. Lignosulfonate based dispersants could be used, for example, in an amount between 0.1 and 0.4 percent by weight based on the dry cement content of the slurry.

Dispersants may be added to improve the mixability of the slurry at the surface; to allow higher densities of slurry to be used, and still mixed and pumped, and to lower rheologies of the slurry to reduce pumping pressures required, along with enabling the slurry to be sufficiently dense so that solids will tend to settle once the slurry is in place in a fracture.

The teachings of this disclosure may be useful in sand/fines control. Cracked mortar stimulation does not have proppant particles that can later flow back into the well. This eliminates the need for sand control measures like solid separations on surface during flowback or the need to place resin coated proppant in the near wellbore. Also, as a load bearing structure, it provides long term stability to the hydraulic fracture and through great coverage of the fracture face, reduces the possibilities of fines production from fracture wall degradation. This properties in highly unconsolidated formations or shales that have high degree of proppant embedment can benefit even greatly from cracked mortar applications. For these reasons, cracked mortar when has enough conductivity through the cracks can have better sand control performance compared to agglomerated sand or engineered (ceramic) proppants.

In some instances, multiple fractures may be provided at the same time or in a continuous operation. In some instances, essentially all of the fractures provided from a wellbore within the formation could be provided at the same time, or within a continuous operation. When fractures are provided using a mortar slurry with a plurality of fractures being provided in a single operation, a pressure within the casing at locations along the wellbore at which communication is provided between the inside of the casing and the outside of the casing is maintained at or above a pressure at which fractures propagate.

In an instance where a plurality of fractures are provided from a casing where fractures have not been previously provided, the casing could be provided with holes provided in the casing at locations from which fractures are to be provided. In such an instance, packers could be provided separating the holes, or separating the sets of holes, so that the casing is in a wellbore with an annuls between the casing and the wellbore that is not cemented. The packers could be, for example, swellable elastomeric packers, such as packers provided by SwellFix UK Limited. Alternatively, mechanical packers could be provided. Alternatively, openings could be provided that are covered with material that will isolate the inside of the casing from the annulus to provide for wellbore annulus cementing for zonal isolation along the wellbore, but such material being removable after cement is provided in the annulus according to known wellbore annulus cementing techniques. The material covering the openings could be material that is easily destroyed by an acid, or a polymer that is easily dissolved by a hydrocarbon or alcohol that could be subsequently placed in the wellbore. Alternatively, the openings could be covered by material that is strong enough to isolate the inside of the casing from the annulus during cementing operations, but fails when more differential pressure is placed across the covering, such as the initiation of the fracturing process.

In an instance where fractures are provided from a casing where fractures have not been provided, after communication has been provided between the inside of the casing and the subterranean formation, fractures could be initiated by placing a mortar slurry in the wellbore using, for example, a coiled tubing, where the slurry could be placed in the casing from the bottom displacing wellbore fluids upward. Alternatively, the mortar slurry could be put into the casing by bullheading the mortar slurry from the surface. By bullheading, it is meant that the fluids are pumped into the casing at a pressure that is sufficient to force the wellbore fluids to fracture the formation and enter the subterranean formation through the fractures.

Once fractures have been initiated and mortar slurry has filled the casing, considerably less pressure would be needed at the surface to maintain fracture opening, initiation or propagation pressures within the casing. To ensure that all locations within the formation that are provided with communication between the inside of the casing and the subterranean formation are fractured, sufficient surface pressure may be applied to result in the pressure inside of the casing remaining (after accounting for pressure losses in the casing due to fluid flow), at least for a portion of the fracturing operation, being above a fracture opening, or initiation pressure.

By continuous operation it is meant that fluids are pumped into the casing with no need to discontinue the pumping of fluids into the casing for any well intervention operation such as sire line operations or movement of packers or valves. There may be periods when fluids are not being put into the wellbore, and periods when fluid injection is paused to change line-ups or supply, but the wellbore configuration is not altered from the start to completion of the fracturing process.

In an instance where multiple fractures may be provided at the same time or in a continuous operation, an existing wellbore that has been previously fractured could be refractured at existing perforations through the casing, with a plurality of the new fractures provided at the same time or in a continuous operation. In this instance, placement of mortar slurry into the casing could be preceded by injection of some degradable diverter material such as Biovert, available from Halliburtion Company. The degradable diverter material could plug existing propped fractures to force mortar slurry to open different fractures rather than first fill existing fractures and decrease permeability within those fractures. The mortar slurry could also be preceded by an acid treatment as described herein. When mortar slurry is placed in a casing where diverter has not been previously injected, the mortar slurry may fill existing propped fractures, and either extend those fractures or create new fractures from the perforations after a pressure drop within the fracture causes the pressure at the perforation to exceed fracture opening pressure.

When multiple fractures are provided in a continuous operation in a previously fractured and produced well, the mortar slurry will tend to go into regions of the formation from which more fluids have previously been produced, thus lowering formation stress and pore pressures. Thus, the new fractures would tend to grow more in parts of the formation which have been more productive. In another instance, the previously provided fractures would be fractures provided by slick water or polymer gel fracture processes, and thus tended to extend upward from the wellbore. The present fractures resulting from the refracture process, because of the high specific gravity of the mortar slurry, would tend to extend downward, and thus also access previously un produced formation.

Mortar or cement slurry fracturing process, utilizing high density slurry may benefit from single point entry fracturing processes because fractures initiates with such materials may continue to grow downward with no natural limits on the size of the fracture because as the fracture goes to deeper depths, the fracture gradient is exceeded by a larger margin. Thus, if a plurality of clusters of perforations are fractured at one time, the first fracture formed to take all of the slurry, and fractures would be unlikely to form at other perforations. Thus, for fracturing with mortar or cement slurries, an efficient single point entry fracturing process would be desirable in some instances.

The present technology may utilize wire-line controllable valves effective to provide communication between an inside of the wellbore and an outside of the wellbore along the length of the wellbore placed at locations where it is desired to fracture the formation. These valves could be sliding sleeve valves such as the sliding sleeve valves described in U.S. Pat. No. 5,263,683. These valves may be operated by a wire line operated tools capable of latching onto the sliding sleeve and change its position to expose ports initially covered by the sliding sleeve. The wire line operated tool could be, for example, a mechanically shifting 'stroker' tool. For example, a cementing rubber wiper such as is conventionally used in cementing operations or mule shoes such as in the bottom of wireline gauge rings to the bottom of the tool may help push cement residue in the well. This tool string or Bottom Hole Assembly (BHA) may be outfitted with a key assembly designed to be compatible with each sliding sleeve to be opened/closed throughout the length of the wellbore. In the case of horizontal wellbores a tractor tool can be added this (BHA) and acts to transport the BHA across the lateral section of the well (towards the toe) in order to access each sleeve to be opened/closed. Such tools are commercially available and could be modified as necessary to operate such any industry offered sleeves.

The wire-line controllable valves effective to provide communication between the inside and the outside of the wellbore may be installed initially in a closed position, so communication is not provided between the inside of the wellbore and the outside of the casing.

The casing may also be provided with a plurality of second wire-line actuated valves, wherein each second wire-line actuated valve is associated with a first wire-line actuated valve, and each second wire-line activated valve is effective to isolate a portion of the inside of the wellbore upstream (toward the wellhead) from the first valves from a portion of the inside of the wellbore down-stream (toward the toe end of the well) of the first valve. The second wire-line actuated valves may be flapper valves that swing onto seats from the heal end of a lateral wellbore so that pressure from fracturing fluids will press the flapper against the seat and aid in sealing of the valve. The flapper valves could be made of material that decomposed over time at wellbore conditions so that they would permit production from the wellbore after the fracturing operation is completed. These valves could also operate as check valves where fluid flow from the heal end of the wellbore would press the valves closed but fluid flow from the toe end of the well would pass through the valve.

Flappers may optionally be made of easily millable material where they could be easily drilled through after the fracturing operation is completed. In another instance, the flapper valves may be provided that could be opened by an intervention such as a wire-line or coiled tubing conveyed kick-over tool. In another instance, the flapper valves could have flapper elements that can be shattered by, for example, a coiled tubing tool after the fracturing operation is completed. Alternatively, the wire line operating tool could be provided with an element that could be used to shatter the flapper valve, and the flapper valve flapper element shattered after the fracture is provided and prior to the wire-line operating tool being moved to operate the next two associated first and second wire-line operatable valves. The flappers could be designed to shatter into pieces small enough so the pieces do not interfere with operation of the well after the fracturing process is completed.

The second wire line controllable valve could be a flapper valve similar to the flapper valve disclosed in US patent application US2015/0114664.

The second wire line controllable valves may be provided in close proximity to the first wire line controllable valves with which they are associated. The volume between the first wire line controllable valve and the second wire line controllable valve could fill with proppant during the fracturing process because inertia of the solid proppants may carry them past the opening into the fracture and accumulate in the volume past this opening. This volume may therefore be minimized to reduce an amount of proppant that may remain in the wellbore after the fracturing operation is completed.

The second wire line actuated valves could be initially installed in the casing in an open position so the casing has communication from the wellbore to the end of the casing.

After the casing is provided in the wellbore, cement may be provided in the annulus between the casing and the wellbore by conventional means. The cement is provided to provide for zonal isolation, and so that fractures, when they are created, will be created near the location of the valves providing communication between the inside of the casing and the outside of the casing. Cement may be, for example, pumped into the casing from the wellhead, followed by a plug that catches on a seat at the lower, or toe end of the casing. After the plug has seated in the toe end of the casing, the cement is then permitted to cure. Fluids behind the plug could be water or mud weighted to enable relatively easy initiation of a fracture. The plug could also optionally be followed by an actuator such as a wire-line kick-over tool connected to a wire line. This would be a convenient time to place such actuator in a position to be used to operate valves after the wellbore cement has cured.

An initial fracture could be provided at the toe end of the well by pressuring cement plug and fracturing the formation at the end of the casing. In this instance, the plug could be provided that isolates the cement from the wellbore fluids behind the plug, but is designed to fail upon application of pressure from the wellbore fluids. In another instances, rather than fracturing through the cement plug, a valve could be provided in the casing near the toe end of the wellbore effective to, after being moved, provide communication from inside of the wellbore to outside of the wellbore. This valve would not need a flapper valve associated with it that is effective to isolate a portion of the inside of the wellbore upstream from the first valves from a portion of the inside of the wellbore down-stream of the first valve. In another instance, the casing near the toe end of the well could be perforated by a conventional perforation gun using explosives to provide communication from the inside of the casing to the formation outside of the casing.

After the first fracture is formed, the valve to provide communication form inside the wellbore to outside of the wellbore adjacent to the first fracture could be opened, and the valve associated with it to isolate a portion of the inside of the wellbore upstream from the first valves from a portion of the inside of the wellbore down-stream of the first valve could be closed. This is preferably accomplished with a wire line conveyed tool such as a commercially available wire-line kick-over tool.

With the valve providing communication between the inside of the casing and the outside of the casing open, the formation can then be fractured at the location of this valve.

When the second fracture is completed, the wireline conveyed actuator may be moved past the next set of associated valves, causing the next valve proving communication between the inside of the casing and the outside of the casing to be opened, and closing its associated valve to isolate the portion of the inside of the wellbore down-stream of the first valve. A fracture is then provided into the formation from this next opened valve.

The process of moving the actuator past each set of valves, and fracturing the formation form that next location is then repeated until fractures have been provided from each of the wire-line controllable valves effective to provide communication between an inside of the wellbore and an outside of the wellbore.

The process of the present technology may be used to provide individual fractures so that an amount of fluids provided into each fracture is controlled, and no operations are needed between fractures other than moving an actuator past the nest set of associated valves. Fractures could be provided in a wellbore with less equipment than other single entry methods, for example the use of coil tubing to shift the sleeves. The down-hole equipment that is needed includes only a wire line actuator, and the wire-line operated valves. These are simple and reliable pieces of equipment and much more reliable than, for example, packers which need to set and seal repeatedly in current fracturing operations or less expensive than coil or work-string tubing.

In one instance the formation could be fractured in phases as disclosed in US patent application publication 2015/0075784, the contents of which are incorporated herein by reference. Effective placement of fractures in deviated or horizontal wells is challenging. This challenge is highlighted in formations with low permeability. As permeability decreases, smaller spacing is generally necessary to effectively recover hydrocarbons from the formation. However, as the spacing between fractures decreases, the stresses associated with the injection of fluids into the formation to create one fracture is believed to create a "shadow" stress in the formation that negatively influences the placement of the next fracture.

In this instance, the effect of stress shadows on subsequent fractures is reduced by providing the fractures in phases in time. The method includes determining a final economically optimized fracture spacing. The desired spacing may be calculated or otherwise determined on the basis of the minimum economic production rate taking into account formation porosity, hydrocarbon saturation, permeability, and costs associated with completion and production. Such determination might involve calculations of net present value, and accounting for various factors including but not limited to current oil and gas prices, operational costs, and capabilities of the facilities. Then create a first set of fractures at an initial fracture spacing. This initial fracture spacing being larger than the final economically optimized fracture spacing. The method includes allowing production of fluids from the formation through the well bore via the first set of fractures for a period of time. This method includes, after the period of time, creating a second set of fractures between the fractures of the first set. The final fracture spacing is less than or equal to an average fracture spacing between the first set of fractures and the second set of fractures. To apply this method of fracture placement with the present technology involves providing the first set of fractures by skipping the necessary (every other one, pairs, etc) set of wire-line controllable valves. The well is then produced from the first set of fractures for a time period sufficient to reduce the stress shadow from the first fractures. After production has relieved the shadow stress is from the first set of fractures a dedicated intervention with the stroker tool is needed to close all the open first wire-line controllable valves and then commence the same sequence to create the second set of fractures. As the second set of fractures is created the previously stimulated sleeves are opened as the wire line tool is moved up in the well to ensure by the end of the stimulation all sleeves are opened for production.

That which is claimed is:

1. A method to provide fractures in a formation, the method comprising:
   providing a wellbore in the formation;
   providing a casing in the wellbore;
   providing communication between an inside of the casing and the formation;
   initiating a fracture from the communication between the inside of the casing and the subterranean formation;
   propagating the fracture with a fluid comprising mortar slurry;
   prior to propagating the fracture with a fluid comprising mortar slurry, a fluid comprising acid is injected into the formation through the communication between the inside of the casing and the formation; and
   injecting into the wellbore a spacer fluid being injected between the mortar slurry and the fluid comprising acid to prevent back-mixing between the mortar slurry and the fluid comprising acid.

2. The method of claim 1 wherein the acid is selected from the group consisting of: hydrochloric, formic, sulfuric, phosphoric, nitric, or acetic acid, or combinations thereof.

3. The method of claim 1 wherein an amount of the fluid comprising acid is at least 10,000 pounds.

4. The method of claim 3 wherein the amount of the fluid comprising acid is between 10,000 and 1,000,000 pounds.

5. The method of claim 1 wherein the fluid comprising acid comprises from 15 to 28 percent by weight of hydrochloric acid.

6. The method of claim 1 further comprising the step of maintaining a fracture opening pressure on the mortar slurry in the fracture until the mortar slurry is essentially cured.

7. The method of claim 1 wherein the spacer fluid comprises a thickener.

* * * * *